(12) United States Patent
Deppe et al.

(10) Patent No.: US 7,882,922 B2
(45) Date of Patent: Feb. 8, 2011

(54) AGRICULTURAL MACHINE HAVING AN EMERGENCY STOP FUNCTION

(76) Inventors: Marcus Deppe, Hofweg 5A, Halle (DE) 33790; Ekehard Jeppe, Ehlener Strasse 54, Zierenberg (DE) 38289

( * ) Notice: Subject to any disclaimer, the term of this patent is extended or adjusted under 35 U.S.C. 154(b) by 107 days.

(21) Appl. No.: 12/423,836

(22) Filed: Apr. 15, 2009

(65) Prior Publication Data

US 2009/0272597 A1 Nov. 5, 2009

(30) Foreign Application Priority Data

Apr. 14, 2008 (DE) ................ 10 2008 018 877

(51) Int. Cl.
*A01F 12/46* (2006.01)

(52) U.S. Cl. ............... 180/271; 180/315; 180/333; 701/50; 56/10.2 R

(58) Field of Classification Search ............ 56/10.2 R; 180/271, 53.1, 315, 333; 701/50
See application file for complete search history.

(56) References Cited

U.S. PATENT DOCUMENTS 6,247,296 B1 * 6/2001 Becker et al. ............... 56/11.2

FOREIGN PATENT DOCUMENTS

JP 2006-34185 * 2/2006

* cited by examiner

*Primary Examiner*—Ruth Ilan
(74) *Attorney, Agent, or Firm*—Christine Johnson; Johnson & Scaturro, LLC

(57) ABSTRACT

A self-propelled agricultural machine comprises a travel drive, a control element (46), able to be moved by the driver, for controlling the speed of travel of the machine, and at least one work-performing unit (2, 3, 5-13, 24, 27, 28) which, while the machine is travelling, can assume an active state and an inactive state as selected by the driver. The machine is set up to decide whether a movement of the control element (36) which is sensed is a regular control movement or an emergency stop movement, and to change the work-performing unit (2, 3, 5-13, 24, 27, 28) to the inactive state if it is decided that the movement sensed is an emergency stop movement.

18 Claims, 3 Drawing Sheets

AGRICULTURAL MACHINE HAVING AN EMERGENCY STOP FUNCTION

BACKGROUND OF THE INVENTION

The present invention relates to the control of a self-propelled agricultural machine which has at least one work-performing unit which can be operated while the machine is travelling, and in particular to the control of a harvester.

Other features and advantages of the invention can be seen from the description of embodiments which is given by reference to the accompanying drawings. In the drawings:

DESCRIPTION OF THE DRAWING FIGURES

DETAILED DESCRIPTION

Figure 1:
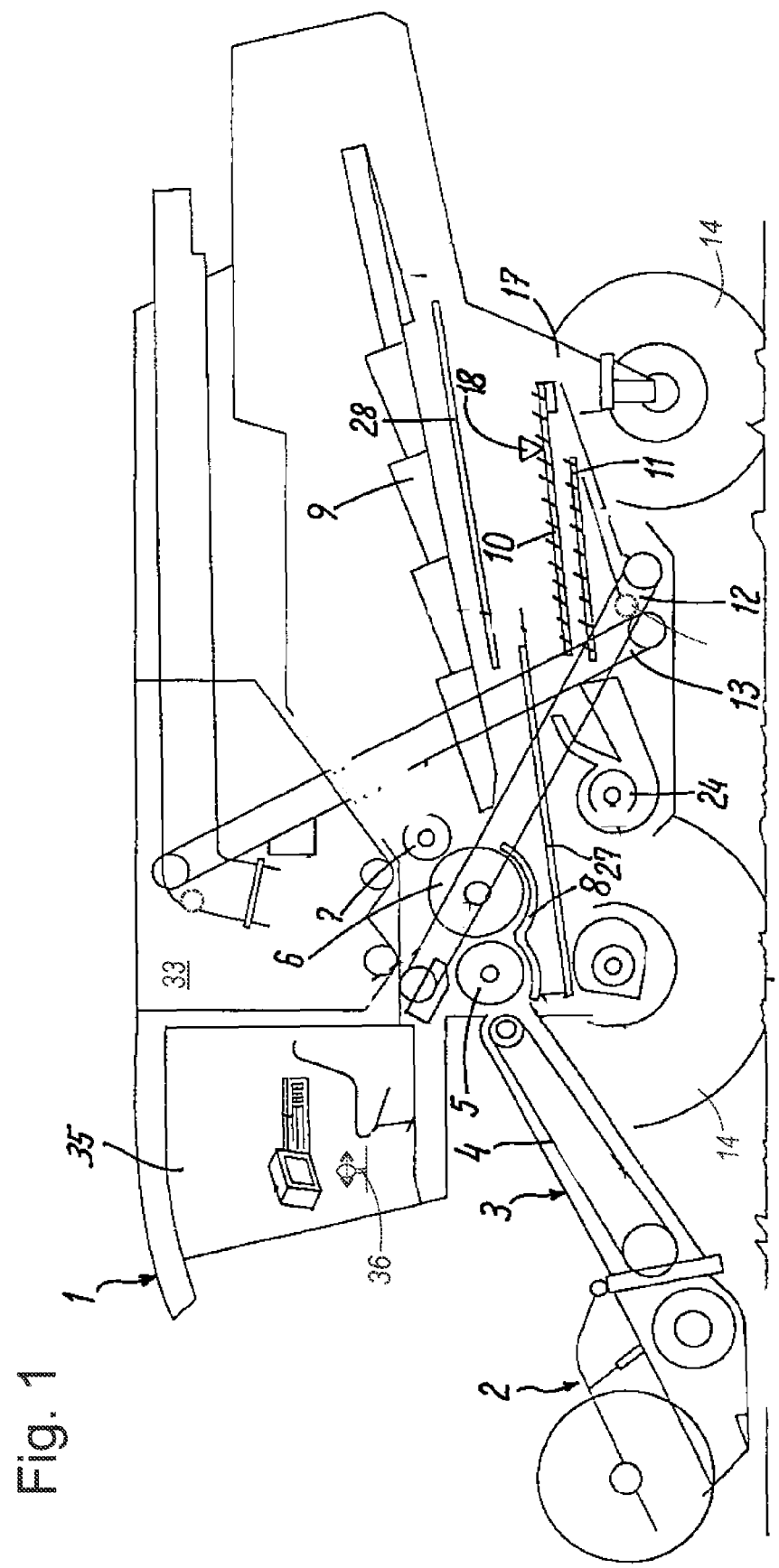
FIG. 1 is a schematic view of a combine harvester according to the invention.

When an agricultural machine is travelling, situations may occur which make it necessary for the machine and the work-performing unit to be stopped quickly, in order, for example, to prevent the machine from picking up foreign material which would cause damage to the work-performing unit or which, if it had to be removed from the work-performing unit, would result in nuisance in the form of a delay to the work, or in order to prevent people or animals that suddenly get in the way of the machine from being injured or even killed. It is true that it is known from, for example, DE 100 64 860 A1 for there to be provided in the intake units of a self-propelled harvester a metal detector which, when it responds, triggers an emergency stop signal, but this presupposes that the metal has made its way into the intake units; the metal therefore has to be removed from the intake passage before the harvesting operation can continue. A break in the harvesting operation is therefore unavoidable.

In practice, it often happens that the driver of a harvester sees an obstacle situated ahead of him before it is detected by the intake units of the harvester. When this is the case, on the one hand he has to bring the harvester to a halt as quickly as possible in order, if possible, to prevent any contact between the harvester and the obstacle, and on the other hand he has to stop the work-performing unit as quickly as possible so that, if contact with the obstacle can no longer be avoided, material from the obstacle is drawn into the machine for the shortest possible distance, to keep down any possible damage to the harvester and, where necessary, to make it possible for the material to be removed quickly. Because the travelling movement of the harvester has to be controllable independently of the operation of the work-performing unit, two controlling actions are required on the part of the driver to bring the harvester and the work-performing unit to a stop, which lengthens the time between the obstacle being seen and the work-performing unit being brought to a stop and increases the risk of foreign material getting in.

DE 102 08 984 A1 proposes a control system for a combine harvester in which a control lever which defines a desired speed for the combine harvester can be displaced both by hand and by means of control motors in order to set a speed of travel which is assessed as optimum by an automatic controller. A manual displacement whose speed differs from that assessed as optimum has to overcome the resistance set up by the control motor, and it is thus difficult to force the combine harvester to make an emergency stop by means of the control lever. An emergency stop function can therefore be triggered by means of a switch which is different from the control lever. To operate this switch, the driver has to move his hand to it, which involves an undesirable loss of time.

There is therefore a need for a self-propelled agricultural machine which, in an emergency, allows both the travelling movement of the machine and also the operation of a work-performing unit of the machine to be stopped with no unnecessary loss of time.

In a self-propelled agricultural machine having a travel drive, having a control element able to be moved by the driver, for controlling the speed of travel of the machine, and having at least one work-performing unit which, while the machine is travelling, can assume an active state and an inactive state as selected by the driver, this aim is achieved in accordance with the invention by virtue of the facts that the machine is set up to decide whether a movement of the control element which is sensed is a regular control movement or an emergency stop movement, and that the work-performing unit is changed to the inactive state if it is decided that the movement sensed is an emergency stop movement.

In a first embodiment, the control element is a driving lever which, with at least one degree of freedom, can be moved in a first direction to increase the speed of travel of the machine and can be moved in the opposite direction to reduce the speed of travel. The driving lever is preferably of the type known from DE 101 40 975 A1 and has, built into the handle of the driving lever, controls which, as well as the speed of travel, also allow other functions of the machine to be controlled.

The machine is usefully set up to sense the speed of a movement of the driving lever in the one degree of freedom, and to assess the movement as an emergency stop movement if the speed exceeds a limiting value. Provision may be made for a further condition for assessing a movement as an emergency stop movement to be that the direction of the movement corresponds to a reduction in the speed of travel. Regardless of its direction, it is however also conceivable for any movement of the driving lever which is sufficiently fast, and which may possibly be caused by involuntary starting back of the driver, to be assessed as an emergency stop movement, because there are no situations which call for sudden acceleration, say to enable the machine to escape quickly from a dangerous area, particularly when operating in the fields.

The limiting value for the speed of the driving lever above which a movement is classed as an emergency stop movement depends of course, in the particular case, on the driving lever's resistance to movement, i.e. on its dead weight. A minimum value of 300 mm/s and a maximum value of 600 mm/s for this speed have generally proved to be suitable for the purpose and realistic.

If a desired value for the speed of travel is assigned to each position of the control element, as is the case with the known driving lever, then, regardless of the speed of the control element, a movement of the control element can be sensed as an emergency stop movement if the difference between the current speed of the machine and the desired speed corresponding to the current position of the control element exceeds a limiting value. In other words, a movement of the control element is assessed as an emergency stop movement when it is so fast that the actual speed of travel of the machine is unable to follow the change in the desired value.

The control element may also be a brake pedal which is known per se.

In this case the machine may be set up to sense the speed of a movement of the brake pedal and to assess the movement as an emergency stop movement if said speed exceeds a limiting value.

Alternatively, the machine may be set up to sense the braking pressure in a braking circuit actuated by the brake pedal and to assess a movement as an emergency stop movement if the speed of the rise in pressure which is caused by the movement exceeds a limiting value. This solution can generally be implemented inexpensively because machines approved for travel on public roads generally have a braking pressure sensor anyway to control brake lights at the rear of the machine, which braking pressure sensor can be made capable of being used for the assessment of braking pedal movement described above with a minimum of additional expense.

The limiting value which is relevant for assessing a movement as an emergency stop movement can preferably be set by the driver. In this way, the driver can, on the one hand, ensure that the system for detecting an emergency stop movement will respond surely and reliably; on the other hand, the setting facility may prompt him to familiarise himself with the operation of the system for detecting an emergency stop movement and with the behaviour of the machine when an emergency stop is detected before a real emergency stop occurs, which is a further improvement in the safety of the machine.

If the self-propelled agricultural machine is a harvester, the work-performing unit is preferably intended to handle harvested crops when in an active state while the machine is travelling.

During a change of the work-performing unit to the inactive state, the throughput of harvested crop of the work-performing unit is preferably controlled in proportion to the speed of travel of the machine. On the one hand this prevents crop for harvesting being run over without being picked up in the event of an emergency stop. On the other hand, the density distribution of the flow of harvested crop inside the machine therefore does not change because of the emergency stop, and after the obstacle has been removed the machine is thus able to immediately start off again from the spot where it came to a halt. In the field, no crop for harvesting is run over or pushed together in front of the machine, which would cause difficulties in restarting the machine and losses of crop for harvesting.

If the work-performing unit comprises a vertically adjustable pick-up arrangement for harvested crop, this latter is preferably in a lowered condition when in the active state and in a raised condition when in the inactive state, to prevent it from colliding with obstacles close to the ground and to interrupt the pick-up of the harvested crop.

The work-performing unit may also comprise a feeding element for harvested crop which is driven in the active state and is stationary in the inactive state.

The work-performing unit is preferably coupled to a drive in the active state and is uncoupled from the drive in the inactive state. It is possible in this way for the drive to be used for other purposes apart from operating the work-performing unit, such say as for driving the travelling movement.

The self-propelled machine may in particular be a combine harvester or a forage harvester.

To avoid losses when harvested crop is being transferred from the self-propelled harvester to an accompanying vehicle, or at least to keep them low, it is sensible for the movement of the accompanying vehicle to be able to be synchronised with that of the machine even in the event of an emergency stop. For this purpose the machine usefully has an interface for transmitting an emergency stop message indicating the sensing of an emergency stop movement to the vehicle accompanying the machine, and the accompanying vehicle has an interface complementary thereto for receiving an emergency stop message from the machine and is set up to make an emergency stop when the emergency stop message is received.

The combine harvester 1 which is shown in FIG. 1 has a chassis having four wheels, and various work-performing units including a front-mounted harvesting attachment 2, which is generally wider than the chassis, for cutting the crop for harvesting and feeding it together transversely to the direction of travel, an elevator 3 which feeds the cut harvested crop into the interior of the combine harvester and which has for this purpose flights which are fastened to continuous, circulating intake chains 4 and which slide the harvested crop along an ascending under-plate of the elevator 3, a pre-accelerating drum 5 which takes the harvested crop over from the elevator 3, a threshing drum 6 which feeds the harvested crop through a gap between itself and a fixed concave 8 and in so doing detaches grains from the harvested crop by a beating and rubbing action, which grains make their way through the concave 8 and onto a grain pan 27. Straw which is discharged from the threshing drum 6 is diverted by a stripper drum 7 onto a plurality of straw shakers 9 which are arranged next to one another across the working width. A vibrating movement of the straw shakers 9 and their stepped configuration cause the straw to be fed to the rear end of the combine harvester and cause grain which is still present in the straw to be separated out, which grain makes its way through the straw shakers 9 onto a return pan 28 and is fed onwards to the grain pan 27 by a vibrating movement of the said return pan 28. The grain pan 27 has a stepped surface, which means that, as a result of a shaking movement of the grain pan 27, the grain situated on it, which is permeated with admixed material such as pieces of straw, chaff, and bits of ear, is fed up the slope and is finally transferred to a top sieve 10 on which there is an incident flow of air from a cleaning blower 24. While the grain is dropping onto the top sieve from the grain pan 27, admixed material is carried away by the flow of air from the blower 24 and is ejected at the rear of the combine harvester. As the grain passes through the top sieve 10, which makes a shaking movement, admixed material which is too large to pass through the top sieve 10, and particularly broken pieces of ear, is fed back to a tailings compartment 17 at the rear end of the top sieve 10, from where it is fed back to the threshing drum 6 by a tailings elevator 12. The cleaning process is repeated in a similar way on a bottom sieve 11 which is arranged below the top sieve 10. Grain which has passed through both sieves 10, 11 makes its way via a grain elevator 13 into a grain tank 33.

Arranged in the driver's cab 35 to control the travelling movement of the combine harvester 1 and the harvesting operation is a driving lever 36. On a handle of the driving lever 36 which can be displaced backwards and forwards in the direction of travel are arranged controls to control various other functions of the combine harvester. These functions may for example include vertical adjustment of the front-mounted harvesting attachment 2 or the operation of the various internal work-performing units such as, say, the front-mounted harvesting attachment 2, the elevator 3, the pre-accelerating drum 5, the threshing drum 6, the stripper drum 7, the straw shakers 9, the sieves 10, 11, the grain pan 26 and the return pan 28 of the combine harvester.

If, during the harvesting operation, the driver sees in front of the front-mounted harvesting attachment 2 people, animals or objects who or which must not be seized by the front-mounted harvesting attachment 2, his reflex reaction is first to jerk the driving lever 36 back in order to bring the combine harvester 1 to a halt as quickly as possible. Other protective actions such as, say, raising the front-mounted harvesting attachment 2 or stopping the cutting blades of the front-mounted harvesting attachment, or the like, by operating an appropriate control take extra time, even when the said controls are mounted on the handle of the driving lever 36. To minimise losses of time of this sort, a control circuit (not shown), which is functionally connected on the one hand to the driving lever 36 and on the other hand to a drive engine of the combine harvester 1, periodically performs the process which is shown in the flow chart in FIG. 2.

In step S1 of the n-th repetition of the process, the control circuit asks what the current position $x_n$ of the driving lever is via a CAN bus.

In step S2 it calculates the difference $\delta$ between the position $x_n$ and a position $x_{n-1}$ which was sensed in the preceding repeat. If this difference $\delta$ is less than a threshold value $\delta_{max}$ which is preset at a fixed value or which is selected by the user and which is typically in a range between 300 mm/s and 600 mm/s, the control circuit detects that the combine harvester is in normal operation in step S3 and sets a new desired speed $V_{soll}(x_n)$ for the combine harvester by reference to a characteristic curve $v_{soll}(x)$ stored in the control circuit (S4).

The threshold value $\delta_{max}$ may be a constant but it may equally well be defined as an ascending function of $x_n$ to ensure that the value set can be exceeded and an emergency stop can be triggered even if the movement of the driving lever 36 from the neutral position is only a small one.

In step S5, the control circuit sets the power of the driving engine in order to minimise the difference between the said new desired speed $v_{soll}(x_n)$ and the current actual speed $v_{ist}(x_n)$ of the combine harvester and in this way to regulate the speed of travel of the combine harvester to suit the wishes of the driver.

If however, in step S3, the control circuit detects that the difference $\delta$ is more than the threshold value $\delta_{max}$, it is assumed that an emergency situation exists in which both the combine harvester 1 and its work-performing units have to be brought to a stop as quickly as possible. When this is the case the control circuit opens a coupling or clutch between the driving engine and the wheels 14 and between the driving engine and the work-performing units, sets the output of the driving engine to a minimum value required to prevent the engine from stopping completely and actuates brakes at the wheels 14 (S6 to S8). As a result of the automatic detection of an emergency, the work-performing units, and especially the cutting blades of the front-mounted harvesting attachment 2, come to a standstill in a very short time. By the front-mounted harvesting attachment 2 also being raised at the same time (S9), as is useful for the purpose, crop for harvesting which has been run over in the interval between the blades of the front-mounted harvesting attachment 2 coming to a halt and the combine harvester 1 stopping is prevented from being pressed flat, and the risk of the front-mounted harvesting attachment 2 coming into contact with the obstacle is also reduced. Once the obstacle has been removed, the harvesting operation can therefore be resumed in the majority of cases by reversing the combine harvester 1 onto the area which has already been harvested and lowering the front-mounted harvesting attachment 2 again.

If the only reason for the emergency stop were an obstacle situated ahead which had not yet been seized by the combine harvester 1, it might be enough for the front-mounted harvesting attachment 2 to be stopped as the only one of the work-performing units, and for the units which follow on from it, such as the elevator 3 and the threshing drum 6, to be allowed to continue to run. This may be considered particularly when the work-performing units situated downstream are fitted at a suitable point with sensors for sensing foreign bodies which are capable, if required, of triggering an emergency stop of the work-performing units and of the entire combine harvester. If no such sensors are present or if the sensors are not capable of detecting all the possible reasons for an emergency stop, the control circuit is usefully designed also to stop the elevator 3, the pre-accelerating drum 5, the threshing drum 6 and the stripper drum 7 together with the front-mounted harvesting attachment 2. Work-performing units which follow on from the items mentioned, such as the straw shaker 9 and the sieves 10, 11 may be stopped as well to make things simple, but provision may also be made for them to continue running, because any foreign material which has got in, if it has reached these units, will generally not do any damage to them and will be separated again from the grain by the normal operation of these units.

Figure 2:
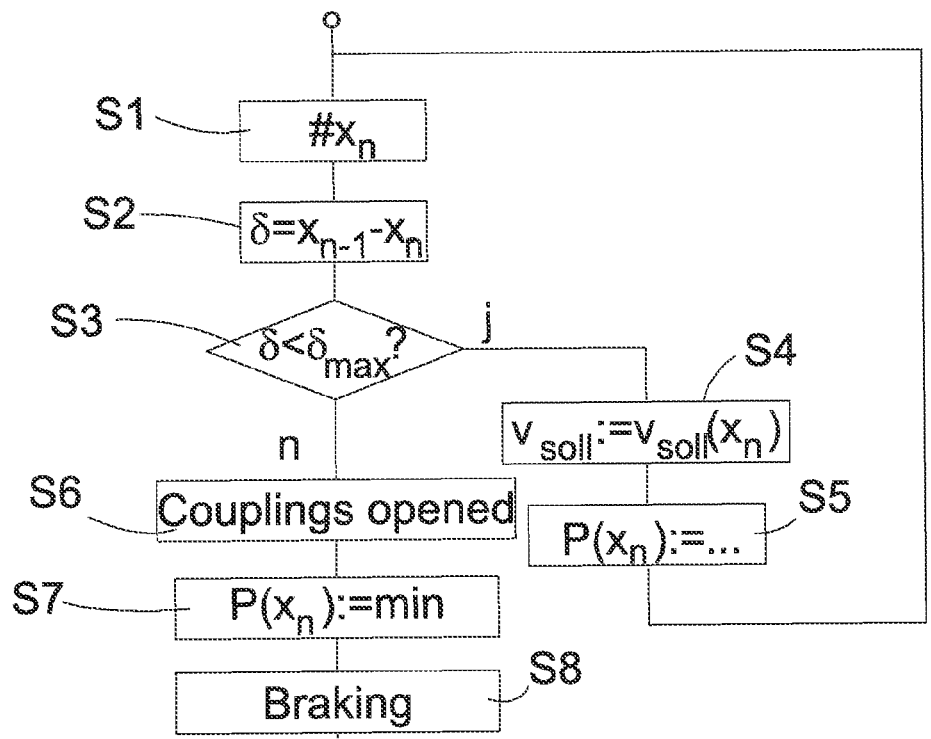
FIG. 2 is a flow chart of the control process which takes place in a control unit of the combine harvester.
Figure 3:
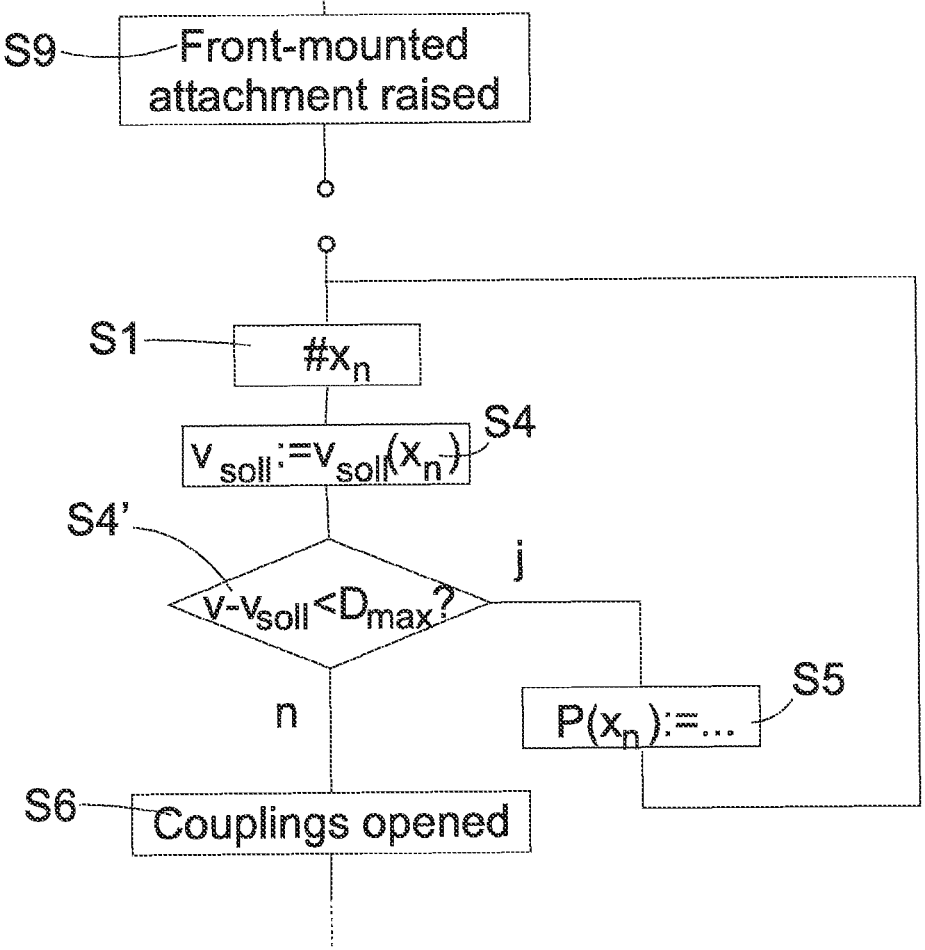
FIG. 3 is a flow chart of an alternative control process.

FIG. 3 is a flow chart of an alternative control process. As in the process shown in FIG. 2, the position $x_n$ of the driving lever 36 is first sensed in step S1. This position has the desired speed $v_{soll}$ assigned to it in step S4. In step S4' a check is made to see whether the difference between the current speed v of the combine harvester 1 and the desired speed $v_{soll}$ is still below a maximum permitted difference $D_{max}$. If it is, operation is normal and in step S5 the output of the drive is adjusted in the way described above. If the limiting value $D_{max}$ is exceeded, there is assumed to be an emergency and steps S6 to S9 follow.

The processes shown in FIGS. 2 and 3 can be combined with one another by inserting step S4' between steps S4 and S5 in FIG. 2.

Rather than the position of the driving lever 36, the position of a brake pedal (not shown) may also be monitored, and an emergency stop process may be triggered by steps S6 to S9 if the speed at which the brake pedal is pressed (or, in a similar way to step S2, the difference between two brake pedal positions in successive iterations of the process) exceeds a limiting value. Where there is a braking system having brakes which are operated in the conventional hydraulic way, what may also be considered as a criterion for triggering an emergency stop is the exceeding of a limiting value for pressure in the brake fluid of the braking system.

In a preferred embodiment of the invention, the same emergency stop process can be triggered via the driving lever 36 and also via the brake pedal.

Figure 4:
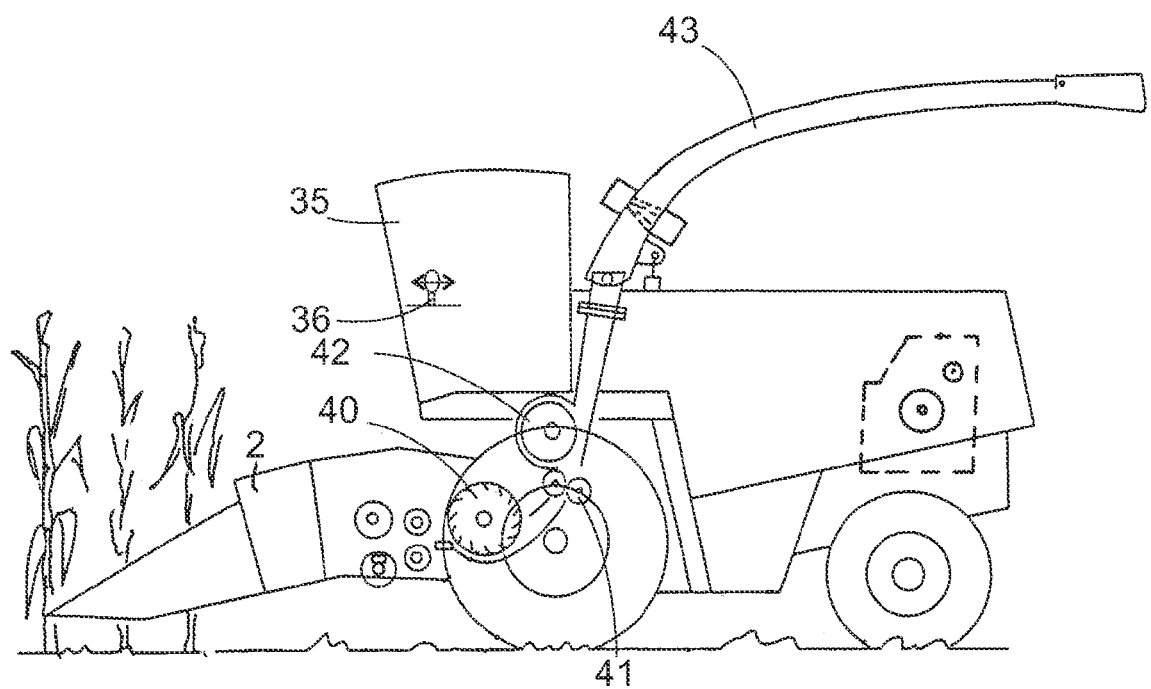
FIG. 4 is a schematic view of a forage harvester according to the invention.

The invention is readily transferable to other self-propelled agricultural machines such as in particular a forage harvester which is shown schematically in FIG. 4. This has, as its work-performing units, in particular a front-mounted harvesting attachment 2 for cutting crop for harvesting, in particular maize, and a chopper cylinder 40 to which the cut harvested crop is fed. In the chopper cylinder 40, comminuted harvested crop makes its way, via a pair of conditioning rollers 41 between which maize grains which have remained intact as they passed through the threshing drum 40 are ground to pieces, and a post-accelerator 42, to a discharge chute 43 and via this latter into a space for storage in an accompanying vehicle which travels along next to the forage harvester. In this case, too, a control circuit monitors, in the manner which was described above by reference to FIGS. 2 and 3, the position of a driving lever 36 in the driver's cab 35 and, if required, the actuation of a brake pedal. In the present case, the control circuit is fitted in addition with a radio interface for communicating with the accompanying vehicle.

If one of the criteria for an emergency stop which were described above by reference to FIG. 2 or 3 has been satisfied, the control circuit brakes the forage harvester and stops its work-performing units 2, 40, 41, 42. It is particularly important in the present case for all the work-performing units to be stopped and for no more harvested crop to be transferred to the accompanying vehicle because, unlike the combine harvester, the forage harvester does not separate out foreign material. Any pieces of metal which were accidentally picked up would therefore be transferred to the accompanying vehicle along with the harvested crop if the work-performing units were not stopped immediately and would constitute a considerable threat to cattle which were fed on the harvested crop. Because the control circuit stops the work-performing units simultaneously with the travelling movement of the forage harvester, the likelihood of dangerous foreign material being transferred is minimised.

To prevent pieces of metal from being transferred, there is provided, in a more sophisticated embodiment, in the front-mounted harvesting attachment 2 or at some other suitable point, a metal detector which, if metal is detected in the harvested crop, triggers an immediate stop of the cutting blades, the chopper cylinder 40, the conditioning rollers 41 and the post-accelerator 42. These units can be stopped in a shorter time than the travelling movement of the forage harvester can. If on the other hand the driver triggers an emergency stop by operating the driving lever 36 or the brake pedal, the cutting blades and the chopper cylinder are slowed in synchronisation with the travelling movement. In this way, any running over of the crop for harvesting before a complete standstill is prevented and the harvesting operation can be resumed straightaway following the stop.

In the case of the forage harvester, the emergency stop process comprises, in addition to steps S6 to S9 in FIG. 2, a further step comprising the transmission of an emergency stop message to the accompanying vehicle via the radio interface. The accompanying vehicle is equipped with a complementary radio interface, and by its likewise making an emergency stop when this message is received the forage harvester and the accompanying vehicle are slowed down substantially in unison, which means that the accompanying vehicle stays in its position below an outlet opening of the discharge chute 43 even during the braking and there are no losses of chopped harvested crop.

A cruise control or autopilot function which keeps the speed of the forage harvester and/or the accompanying vehicle constant during normal harvesting operation and in this way makes it easier for the accompanying vehicle to drive along next to the forage harvester in synchronisation with it, is put out of operation by the emergency stop.

If the driver's cab 35 is actively damped, i.e. is provided with controllable damping members, the control circuit usefully increases the stiffness of the damping members at the time of an emergency stop to stop any excessively violent nodding and/or swaying movements which exceed the freedom which the cab 35 has to move. Abrupt jolts, which are very unpleasant for the driver and may involve a risk of injury, are avoided in this way.

REFERENCE NUMERALS

1 Combine harvester
2 Front-mounted harvesting attachment
3 Elevator
4 Intake chains
5 Pre-accelerating drum
6 Threshing drum
7 Stripper drum
8 Concave
9 Straw shaker
10 Top sieve
11 Bottom sieve
12 Tailings elevator
13 Grain elevator
14 Wheel
17 Tailings compartment
24 Blower
27 Grain pan
28 Return pan
33 Grain tank
35 Driver's cab
36 Driving lever
40 Chopper cylinder
41 Conditioning roller
42 Post-accelerator
43 Discharge chute

The invention claimed is:

1. Self-propelled agricultural machine having a travel drive, having a control element (46) able to be moved by the driver, for controlling the speed of travel of the machine, and having at least one work-performing unit (2, 3, 5-13, 24, 27, 28, 40, 41, 42) which, while the machine is travelling, can assume an active state and an inactive state as selected by the driver, characterised in that the machine is set up to decide (S3, S4') whether a movement of the control element (36) which is sensed is a regular control movement or an emergency stop movement, and the work-performing unit (2, 3, 5-13, 24, 27, 28, 40, 41, 42) is changed to the inactive state (S6-S9) if it is decided that the movement sensed is an emergency stop movement.

2. Machine according to claim 1, characterised in that the control element is a driving lever (36) which, with at least one degree of freedom, can be moved in a first direction to increase the speed of travel of the machine and can be moved in the opposite direction to reduce the speed of travel.

3. Machine according to claim 2, characterised in that the machine is set up to sense the speed of a movement of the driving lever (36) in the one degree of freedom (S2), and to assess the movement as an emergency stop movement (S3) if the speed exceeds a limiting value.

4. Machine according to claim 3, characterised in that the limiting value is at least 300 mm/s.

5. Machine according to claim 3, characterised in that the limiting value is at most 600 mm/s.

6. Machine according to claim 3 characterised in that the limiting value can be set by the driver.

7. Machine according to claim 1, characterised in that a desired value ($v_{soll}$) for the speed of travel is assigned to each position (x) of the control element (36), and in that a movement of the control element (36) is sensed as an emergency stop movement (S4') if the difference between the current speed (v) of the machine and the desired speed ($v_{soll}$) exceeds a limiting value.

8. Machine according to claim 1, characterised in that the control element is a brake pedal.

9. Machine according to claim 8, characterised in that the machine is set up to sense the speed of a movement of the brake pedal and to assess the movement as an emergency stop movement if the speed exceeds a limiting value ($D_{max}$) (S4').

10. Machine according to claim 8, characterised in that the machine is set up to sense a braking pressure in a braking circuit actuated by the brake pedal and to assess a movement as an emergency stop movement if the speed of the rise in pressure which is caused by the movement exceeds a limiting value.

11. Machine according to claim 1, characterised it is a harvester, and in that the work-performing unit (2, 3, 5-13, 24, 27, 28, 40, 41, 42) is intended to handle harvested crops when in an active state while the machine is travelling.

12. Machine according to claim 11, characterised in that, during a change of the work-performing unit (2, 3, 5-13, 24, 27, 28, 40, 41, 42) to the inactive state, the throughput of harvested crop of the work-performing unit is controlled in proportion to the speed of travel of the machine.

13. Machine according to claim 1, characterised in that the work-performing unit comprises a pick-up arrangement (2) for harvested crop, which is in a lowered condition when in the active state and in a raised condition when in the inactive state.

14. Machine according to claim 1, characterised in that the work-performing unit comprises at least one feeding element (3) for harvested crop which is driven in the active state and is stationary in the inactive state.

15. Machine according to one claim 1, characterised in that the work-performing unit is coupled to a drive in the active state and is uncoupled from the drive in the inactive state.

16. Machine according to claim 1, characterised in that it is a combine harvester or a forage harvester.

17. Machine according to claim 1, characterised by an interface for transmitting an emergency stop message indicating the sensing of an emergency stop movement to a vehicle accompanying the machine.

18. Machine according to claim 17 further comprising an accompanying vehicle including an interface for receiving an emergency stop message from the machine and is set up to make an emergency stop when the emergency stop message is received.

* * * * *